US008642861B2

(12) United States Patent
Ball et al.

(10) Patent No.: US 8,642,861 B2
(45) Date of Patent: Feb. 4, 2014

(54) ULTRA-HIGH TENSILE STRENGTH MARAGING STEEL MUSIC INSTRUMENT STRING

(75) Inventors: Brian N Ball, Indio, CA (US); James C Harrington, Palm Desert, CA (US)

(73) Assignee: Ernie Ball, Inc., San Luis Obispo, CA (US)

( * ) Notice: Subject to any disclaimer, the term of this patent is extended or adjusted under 35 U.S.C. 154(b) by 34 days.

(21) Appl. No.: 13/586,982

(22) Filed: Aug. 16, 2012

(65) Prior Publication Data

US 2013/0269501 A1 Oct. 17, 2013

Related U.S. Application Data

(60) Provisional application No. 61/624,801, filed on Apr. 16, 2012.

(51) Int. Cl.
*G01D 3/10* (2006.01)

(52) U.S. Cl.
USPC .......... 84/297 S

(58) Field of Classification Search
USPC .......... 84/297 S
See application file for complete search history.

(56) References Cited

U.S. PATENT DOCUMENTS

| | | | | |
|---|---|---|---|---|
| 3,322,580 A * | 5/1967 | Haynes | 148/529 |
| 3,359,094 A * | 12/1967 | Bieber et al. | 420/84 |
| 3,453,102 A * | 7/1969 | Floreen et al. | 420/95 |
| 3,584,518 A * | 6/1971 | Hurlow | 74/502.5 |
| 5,091,264 A | 2/1992 | Daxelmueller et al. | |
| 6,348,646 B1 | 2/2002 | Parker et al. | |
| 7,777,108 B2 | 8/2010 | Vosough et al. | |
| 7,781,655 B2 | 8/2010 | Vosough et al. | |
| 8,222,504 B1 * | 7/2012 | Ball | 84/297 S |
| 2013/0269501 A1 * | 10/2013 | Brian et al. | 84/297 S |

FOREIGN PATENT DOCUMENTS

| | | |
|---|---|---|
| JP | 56-065922 A | 6/1981 |
| JP | 59-159967 A | 9/1984 |
| JP | 04-069155 A | 3/1992 |
| WO | 2009-075644 A1 | 6/2009 |

OTHER PUBLICATIONS

Article entitled "Ultra High-Strength Maraging Steel Wire," by R. L. Cairns, publication date unknown.

Article entitled "Standard Specification for Steel Wire, Music Spring Quality," published in the ASTM International, Designation A228/A228m-07, publication date unknown.

The International Search Report and the Written Opinion of the International Searching Authority, Mailed on Apr. 25, 2013, in International Application No. PCT/US2013/022104.

* cited by examiner

*Primary Examiner* — Robert W Horn

(74) *Attorney, Agent, or Firm* — Sheldon Mak & Anderson PC; Denton L. Anderson

(57) ABSTRACT

A musical instrument string is made of maraging steel and has a tensile strength greater than 430 ksi.

8 Claims, 2 Drawing Sheets

ULTRA-HIGH TENSILE STRENGTH MARAGING STEEL MUSIC INSTRUMENT STRING

RELATED APPLICATION

This application is a continuation of U.S. Patent Application Ser. No. 61/624,801, filed on Apr. 16, 2012, entitled ULTRA-HIGH TENSILE STRENGTH MARAGING STEEL CORE WIRE AND PLAIN MUSIC INSTRUMENT STRINGS," the entirety of which is incorporated herein by reference.

FIELD OF THE INVENTION

This invention relates generally to musical instrument strings and, more specifically, to metallic musical instrument strings for musical instruments.

BACKGROUND OF THE INVENTION

Prior art steel musical instrument strings are traditionally principally comprised of spring tempered high-carbon steel (typically referred to as "music wire" or "piano wire"). Similarly, wrapped musical instruments strings typically employ a core wire principally comprised of spring tempered high-carbon steel. (Typically, such wrapped strings ["wound strings"] are used for strings providing the lower notes on the instrument. For example, wrapped strings are typically used on all strings of a bass guitar, the four bass strings of a steel-string acoustic guitar, the three bass strings of a six-string guitar and the four bass strings of a seven-string electric guitar.)

It is common for stringed musical instruments to amplify the sound provided by such instruments. Such amplification is typically provided by disposing the strings of the instrument over a pickup device. A pickup device acts as a transducer that captures mechanical vibrations from the strings, and converts them to an electrical signal which can be amplified, recorded and/or broadcast. For musical instruments having steel strings, the most common type of pickup is a magnetic pickup. A magnetic pickup consists of a permanent magnet wrapped with a coil of fine enameled copper wire. The vibration of nearby soft magnetic strings modulates the magnetic flux linking the coil, therefore inducing an alternating current through the coil. This signal is then sent on to amplification or recording equipment.

For users of steel stringed musical instruments, there is a continual need for musical strings which provide increased response to magnetic pickups.

There is also a continual need for musical instrument strings which are stronger and more resistant to premature string breakage.

SUMMARY OF THE INVENTION

The invention satisfies these needs. The invention is a musical instrument string made of maraging steel and having a tensile strength greater than 430 ksi.

DRAWINGS

These and other features, aspects and advantages of the present invention will become better understood with reference to the following description, appended claims and accompanying drawings where:

DETAILED DESCRIPTION OF THE INVENTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a musical instrument string 10 made of maraging steel and having a tensile strength greater than 430 ksi. By "instrument string" in this application, it is meant a non-wrapped musical string and the core wire of a wrapped musical string. A musical instrument string 10 made of maraging steel is contrasted with ordinary music wire (also termed "piano wire") as described in ASTM A228.

Figure 1:
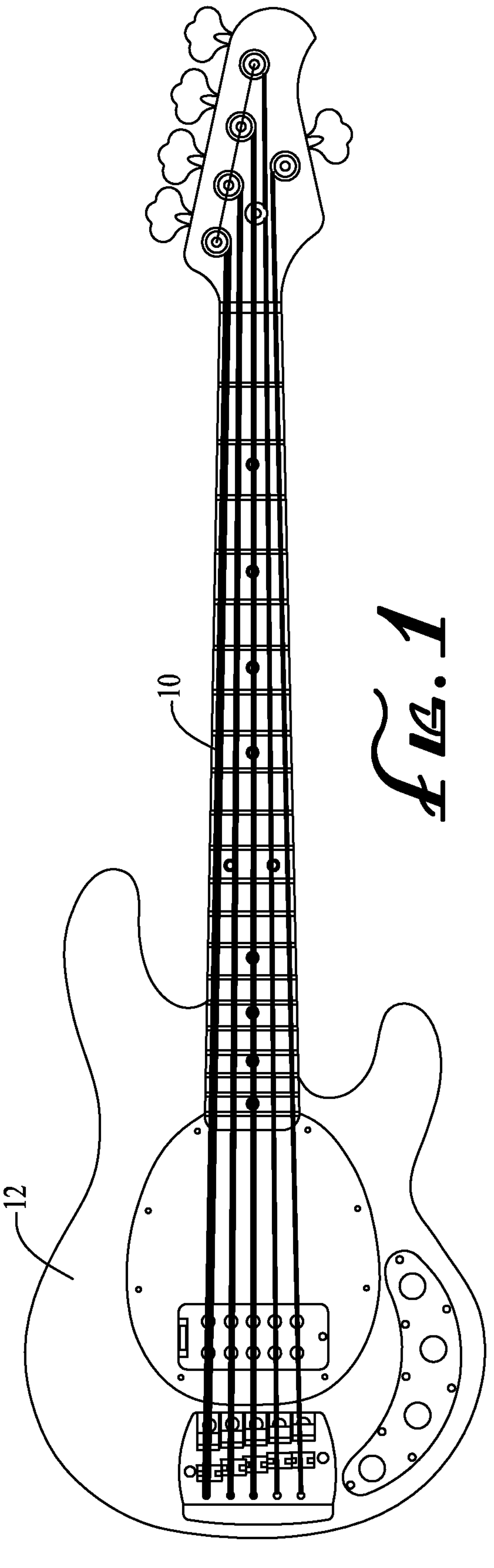
FIG. 1 is a top view of a musical instrument having features of the invention.

The invention is also a stringed musical instrument 12 (illustrated in FIG. 1) having one or more of the musical strings 10 of the invention.

Preferably, the instrument string 10 has a tensile strength in excess of 430 ksi, most preferably between about 430 ksi and about 500 ksi. Maraging instrument strings 10 having tensile strengths less than 430 ksi tend to have inferior strength properties, and maraging instrument strings 10 having tensile strengths greater than 500 ksi tend to be insufficiently ductile.

In a typical embodiment of the invention, the instrument string 10 comprises iron, 15-20 wt % nickel, 6-16 wt % cobalt and 2-6 wt % molybdenum. The instrument string 10 can also comprise titanium in amounts up to about 2 wt %.

Typically, the diameters of the musical instrument strings 10 of the invention are between about 0.008 inches and about 0.026 inches. Common diameters of smaller instrument strings are those having a diameter of 0.01 inch. These include, but are not limited to, strings with diameters of 0.008 inch, 0.009 inch, 0.010 inch, 0.011 inch and 0.012 inch.

The instrument string 10 must be sufficiently ductile to allow the string to be easily knotted at both of its ends. Preferably, the ductility of the musical instrument string 10 is between about 5% and about 12%.

The maraging steel strings 10 of the invention are typically precipitation hardened and/or aged to provide the improved tensile strength and fatigue strength when compared to music wire. In a preferred embodiment, the instrument strings 10 of the invention are prepared by a process composed of four steps: 1) cold working—to an intermediate diameter, 2) annealing, 3) cold working to a final diameter, and 4) aging. Unlike most maraging steels, this process utilizes both cold working and precipitation hardening mechanisms in order to provide ultra high tensile strength properties. Also, the process provides the instrument strings 10 of the invention with enhanced ductility to more easily form lock twists and secure brass ball ends. The aforementioned techniques for improving the tensile strength and fatigue strength of maraging steel wire are known in the art. For example, see "Ultra High-Strength Maraging Steel Wire" by R. L. Cairns (ASM Transactions Quarterly, Vol. 62, The American Society of Metals, March 1969, pages 244-256).

The instrument strings 10 of the invention have an improved magnetic signature compared to music wire strings. Such improved magnetic signature provides a unique timbre and tonality not previously known. The unique tonality centers around the elevated attraction from the magnets of the instrument's pickup and the vibrations of the string 10. This unique tonality provides increased creative options when used in stringed instruments 12 played in traditional styles. The unique tonality can also provide creative advantages in stringed instruments 12 played in new styles.

Additionally, the improved tensile strength and fatigue strength of the musical strings 10 limit the problem of premature string breakage.

Furthermore, the higher tensile strength of the instrument strings 10 of the invention allow for smaller core-to-wrap ratios than with prior art string constructions. This provides enhanced vibrations of the strings 10 and superior sustain in string tonality. Also, strings with smaller cores are easier to bend and require less downward finger pressure to play each note—thereby making the strings easier to play.

In a typical embodiment, the music instrument string 10 of the invention has a breaking strength of about 460,000 psi with almost 10% elongation before breaking. This is contrasted with conventional music wire of the same gauge which exhibits a breaking strength of only about 400,000 psi with similar elongation. Moreover, the tonal response of the musical string 10 of the invention provides a higher output and a rounder, fuller tonality than equivalent conventional musical strings. Such tonal differences are not fully understood, but appear to be most directly attributed to a stronger fundamental frequency and second harmonic which yields a stronger signal output.

Some manufacturers of the prior art have experimented with producing conventional music strings with enhanced tensile strength. However, most of such strings are less ferromagnetic than conventional music wire or only slightly magnetic, and therefore, yield a relatively weak signal.

EXAMPLE

Audio output comparison testing was made on (i) a music wire musical string having a thickness of 0.010" diameter and a tensile strength of 410 ksi and a (ii) maraging steel musical string 10 having a thickness of 0.010" diameter and a tensile strength of 460 ksi. Comparison testing was conducted on a testing apparatus with an automated plucking mechanism to ensure the strings were plucked with exactly the same attack. Except for the difference in strings, the comparison testing was carried out under essentially identical conditions.

In the comparison testing, each string was evaluated by using a guitar plucking mechanism which plucks each test string identically. The signal from each pluck was recorded using specialized software for evaluating sound profiles.

Figure 2:
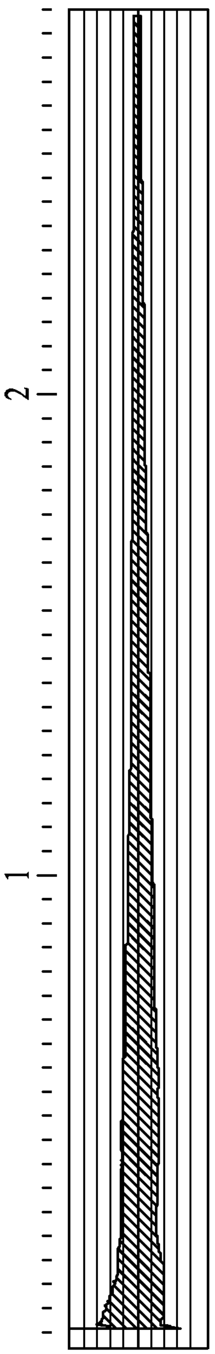
FIG. 2 PRIOR ART
FIG. 2 is a graphical display showing audio output data for a musical string of the prior art.
Figure 3:
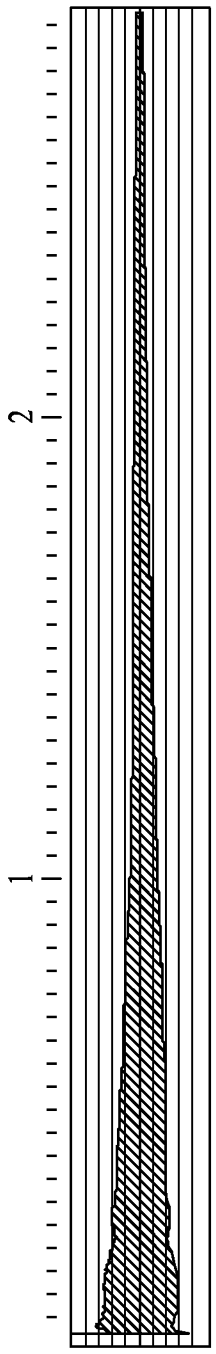
FIG. 3 is a graphical display showing audio output data for a musical string having features of the invention.

The results of the comparison testing are illustrated in FIGS. 2 and 3 and in the data sets designated below as Metric 1 and Metric 2. FIGS. 2 and 3 are envelope histories of the recorded output data for each string. In FIGS. 2 and 3, the x-axes indicate times after each string is plucked, and the y-axes indicate the audio outputs of each string. Metric 1 was derived from measuring sound clips of maraging steel and conventional music wire with a signal level meter, in order to measure how loud the string pluck was, i.e., peak RMS output. Metric 2 was derived from measuring the same sound clips from a spectrograph to measure how loud each harmonic was.

Metric 1:

Peak RMS Output (Entire Signal/All Harmonics)

Music Wire: −12.1 dB

Maraging Steel: −11.3 dB

Metric 2:

Peak Output of 1st Harmonic (Fundamental Frequency)

Music Wire: −33 dB

Maraging Steel: −31 dB

Peak Output of 2nd Harmonic

Music Wire: −20 dB

Maraging Steel: −18 dB

Peak Output of 3rd Harmonic

Music Wire: −21 dB

Maraging Steel: −18 dB

As can be seen by comparing FIG. 2 with FIG. 3 and by comparing Metric 1 with Metric 2, the maraging steel string 10 is a significantly louder string, and the maraging string 10 has a notably stronger first, second and third harmonics—which indicates a fuller sounding string with increased low frequency response.

Having thus described the invention, it should be apparent that numerous structural modifications and adaptations can be resorted to without departing from the scope and fair meaning of the instant invention as set forth hereinabove and as described hereinbelow by the claims.

What is claimed is:

1. A musical instrument string adapted for use on a musical instrument, the musical string comprising iron, 15-20 wt. % nickel, 6-16 wt. % cobalt and 2-6 wt. % molybdenum and of titanium less than about 2 wt. %.

2. The musical instrument string of claim 1 having a ductility greater than about 5%.

3. The musical instrument string of claim 1 having a tensile strength greater than 430 ksi, and wherein the diameter of the string is 0.01 inch.

4. The musical instrument string of claim 1 having a tensile strength between about 430 ksi and 500 ksi.

5. A musical instrument having at least one musical instrument string of claim 1.

6. A maraging steel instrument string or wrapped instrument string core wire comprising iron, 15-20 wt. % nickel, 6-16 wt. % cobalt, 2-6 wt. % molybdenum and of titanium in an amount less than about 2 wt. %.

7. The musical instrument string of claim 6 having a ductility greater than about 5%.

8. A musical instrument having at least one musical instrument string of claim 6.

* * * * *